(12) United States Patent
Dawkins et al.

(10) Patent No.: US 12,210,414 B2
(45) Date of Patent: Jan. 28, 2025

(54) TIERED MEMORY MANAGEMENT SYSTEM

(71) Applicant: Dell Products L.P., Round Rock, TX (US)

(72) Inventors: William Price Dawkins, Lakeway, TX (US); Stuart Allen Berke, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/073,915

(22) Filed: Dec. 2, 2022

(65) Prior Publication Data

US 2024/0184672 A1   Jun. 6, 2024

(51) Int. Cl.
*G06F 11/10*   (2006.01)
*G06F 11/07*   (2006.01)

(52) U.S. Cl.
CPC ........ *G06F 11/1076* (2013.01); *G06F 11/076* (2013.01); *G06F 11/0772* (2013.01); *G06F 11/0793* (2013.01)

(58) Field of Classification Search
CPC .............. G06F 11/1076; G06F 11/076; G06F 11/0772; G06F 11/0793
USPC ....................................................... 714/6.2
See application file for complete search history.

(56) References Cited

U.S. PATENT DOCUMENTS

| 10,725,664 B2 | 7/2020 | Kelkar et al. |
| 2016/0344834 A1* | 11/2016 | Das ................. H04L 67/1097 |
| 2021/0132999 A1* | 5/2021 | Haywood ............ G06F 9/544 |

OTHER PUBLICATIONS

Wikipedia "failover" pages, retrieved from https://en.wikipedia.org/wiki/Failover. (Year: 2024).*
Wikipedia "Memory hierarchy" page, retrieved from https://en.wikipedia.org/wiki/Memory_hierarchy (Year: 2024).*

* cited by examiner

*Primary Examiner* — Yair Leibovich
(74) *Attorney, Agent, or Firm* — Joseph Mencher

(57) ABSTRACT

A tiered memory system includes a tiered memory management system that is coupled to a first memory subsystem associated with a first memory subsystem tier, and a second memory subsystem associated with a second memory subsystem tier that is different than the first memory subsystem tier. The tiered memory management system monitors a health of the first memory subsystem associated with the first memory subsystem tier and the second memory subsystem associated with the second memory subsystem tier. When the tiered memory management system identifies a health issue with the first memory subsystem associated with the first memory subsystem tier, it moves data stored in the first memory subsystem associated with the first memory subsystem tier to the second memory subsystem associated with the second memory subsystem tier.

20 Claims, 15 Drawing Sheets

| LOGICAL MEMORY ADDRESS SPACE 702 | PHYSICAL MEMORY SUBSYSTEM 704 |
|---|---|
| 0 | DDR0<br>DIRECT DRAM SUBSYSTEM 604 |
| 1 | LCS2<br>LOCAL CXL SCM SUBSYSTEM 610 |
| 2 | DDR1<br>DIRECT DRAM SUBSYSTEM 604 |
| 3 | LCS0<br>LOCAL CXL SCM SUBSYSTEM 610 |
| 4 | ECM2<br>EXTERNAL CXL MEMORY SUBSYSTEM 612 |
| 5 | DDR1<br>DIRECT DRAM SUBSYSTEM 604 |
| 6 | DDR1<br>DIRECT DRAM SUBSYSTEM 604 |
| 7 | LCS0<br>LOCAL CXL SCM SUBSYSTEM 610 |
| 8 | ECM3<br>EXTERNAL CXL MEMORY SUBSYSTEM 612 |
| 9 | LCS2<br>LOCAL CXL SCM SUBSYSTEM 610 |
| 10 | LCS3<br>LOCAL CXL SCM SUBSYSTEM 610 |

TIERED MEMORY MANAGEMENT DATABASE(S) 406

FIG. 7B

| LOGICAL MEMORY ADDRESS SPACE 702 | PHYSICAL MEMORY SUBSYSTEM 704 |
|---|---|
| 0 | DDR0 DIRECT DRAM SUBSYSTEM 604 |
| 1 | LCS2 LOCAL CXL SCM SUBSYSTEM 610 |
| 2 | DDR1 DIRECT DRAM SUBSYSTEM 604 |
| 3 | LCS0 LOCAL CXL SCM SUBSYSTEM 610 |
| 4 | ECM2 EXTERNAL CXL MEMORY SUBSYSTEM 612 |
| 5 | DDR1 DIRECT DRAM SUBSYSTEM 604 |
| 6 | DDR1 DIRECT DRAM SUBSYSTEM 604 |
| 7 | LCS0 LOCAL CXL SCM SUBSYSTEM 610 |
| 8 | ECM3 EXTERNAL CXL MEMORY SUBSYSTEM 612 |
| 9 | LCS2 LOCAL CXL SCM SUBSYSTEM 610 |
| 10 | LCS3 LOCAL CXL SCM SUBSYSTEM 610 |

TIERED MEMORY MANAGEMENT DATABASE(S) 406

FIG. 8B

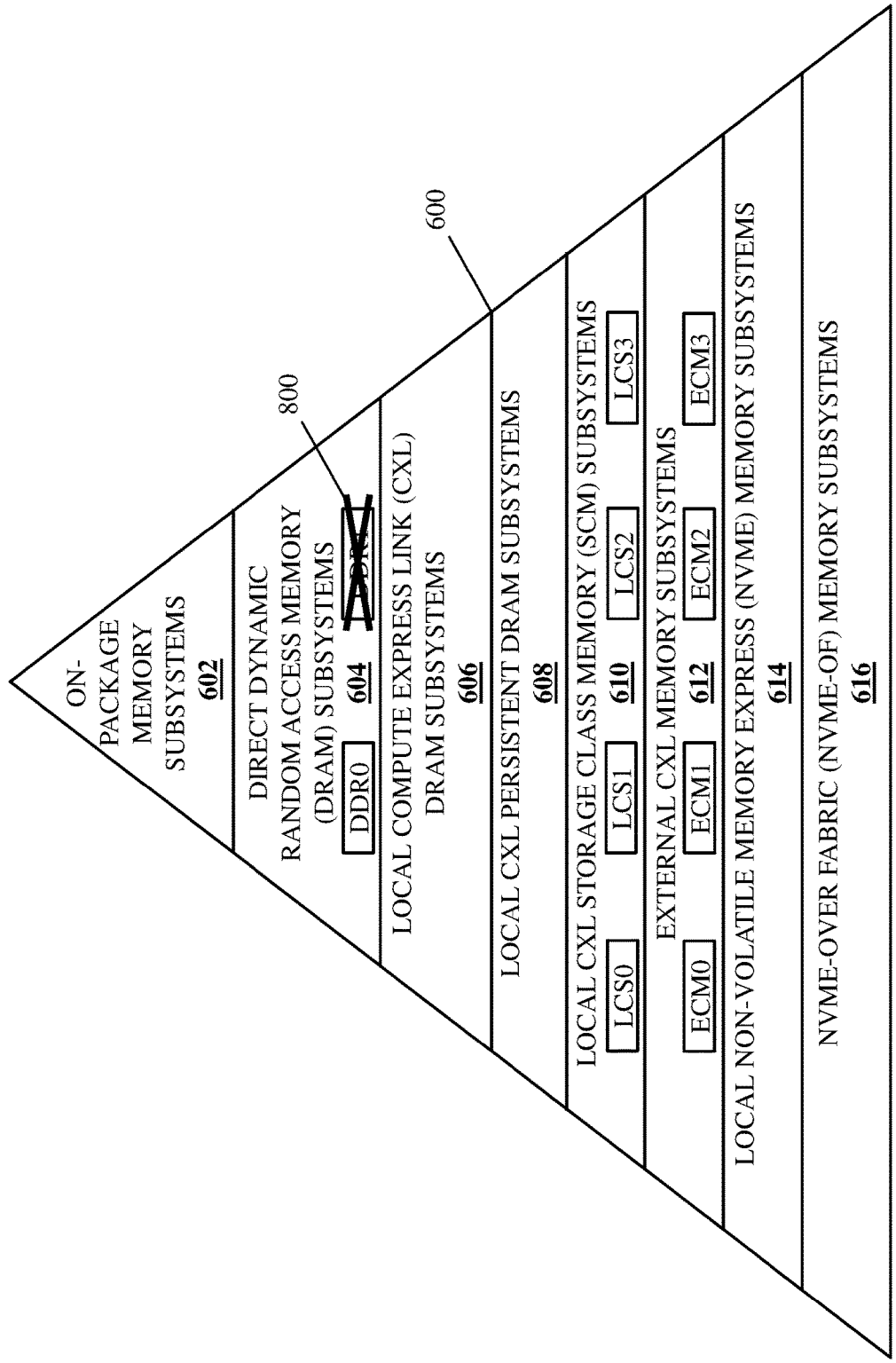

TIERED MEMORY MANAGEMENT SYSTEM

BACKGROUND

The present disclosure relates generally to information handling systems, and more particularly to the management of tiered memory used by information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, desktop computing devices, laptop/notebook computing devices, tablet computing devices, mobile phones, and/or other computing devices known in the art, sometime use tiered memory systems for the storage and use of data. For example, a plurality of memory subsystems that utilize any of a plurality of different types of storage media may be included in computing devices, coupled to a network, and/or may be otherwise accessible by any of the computing devices that utilize the tiered memory system, and may be assigned to provide for the storage and/or utilization of data by any of those computing devices based a range of factors such as cost, availability, performance, data recovery capabilities, and/or other tiered memory subsystem factors. In addition, conventional tiered memory systems monitor data access frequency, and operate to move data with relatively high access frequency to relatively higher memory subsystems tiers, while moving data with relatively low access frequency to relatively lower memory subsystem tiers.

As will be appreciated by one of skill in the art, tiered memory systems allow for the provisioning of relatively larger memory footprints and relatively lower overall costs per memory capacity, but also introduce issues. For example, tiered memory systems are associated relatively high complexity and introduce relatively more memory locations where failures or other memory unavailability may occur that can render the tiered memory system unavailable. For example, when memory subsystems in the tiered memory system utilize particular persistent memory technologies that are subject to wearing out (e.g., due to repeated data writes to those memory subsystem), failure or other unavailability of a single memory subsystem used to provide an operating system or other application due to wear can result in failure or other unavailability of that operating system or other application.

Accordingly, it would be desirable to provide a tiered memory system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a tiered memory management engine that is configured to: monitor a health of a first memory subsystem associated with a first memory subsystem tier and a second memory subsystem associated with a second memory subsystem tier that is different than the first memory subsystem tier; identify a health issue with the first memory subsystem associated with the first memory subsystem tier; and move, in response to identifying the health issue with the first memory subsystem, data stored in the first memory subsystem associated with the first memory subsystem tier to the second memory subsystem associated with the second memory subsystem tier.

BRIEF DESCRIPTION OF THE DRAWINGS

FIG. 7B is a schematic view illustrating an embodiment of data storage in the memory subsystems available in the tiered memory system of FIG. 7A during the method of FIG. 5.

FIG. 8B is a schematic view illustrating an embodiment of the identification of data stored in the memory subsystem identified with the health issues of FIG. 8A during the method of FIG. 5.

FIG. 8D is a schematic view illustrating an embodiment of the identification of memory subsystem unavailability in the tiered memory system of FIG. 7A during the method of FIG. 5.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
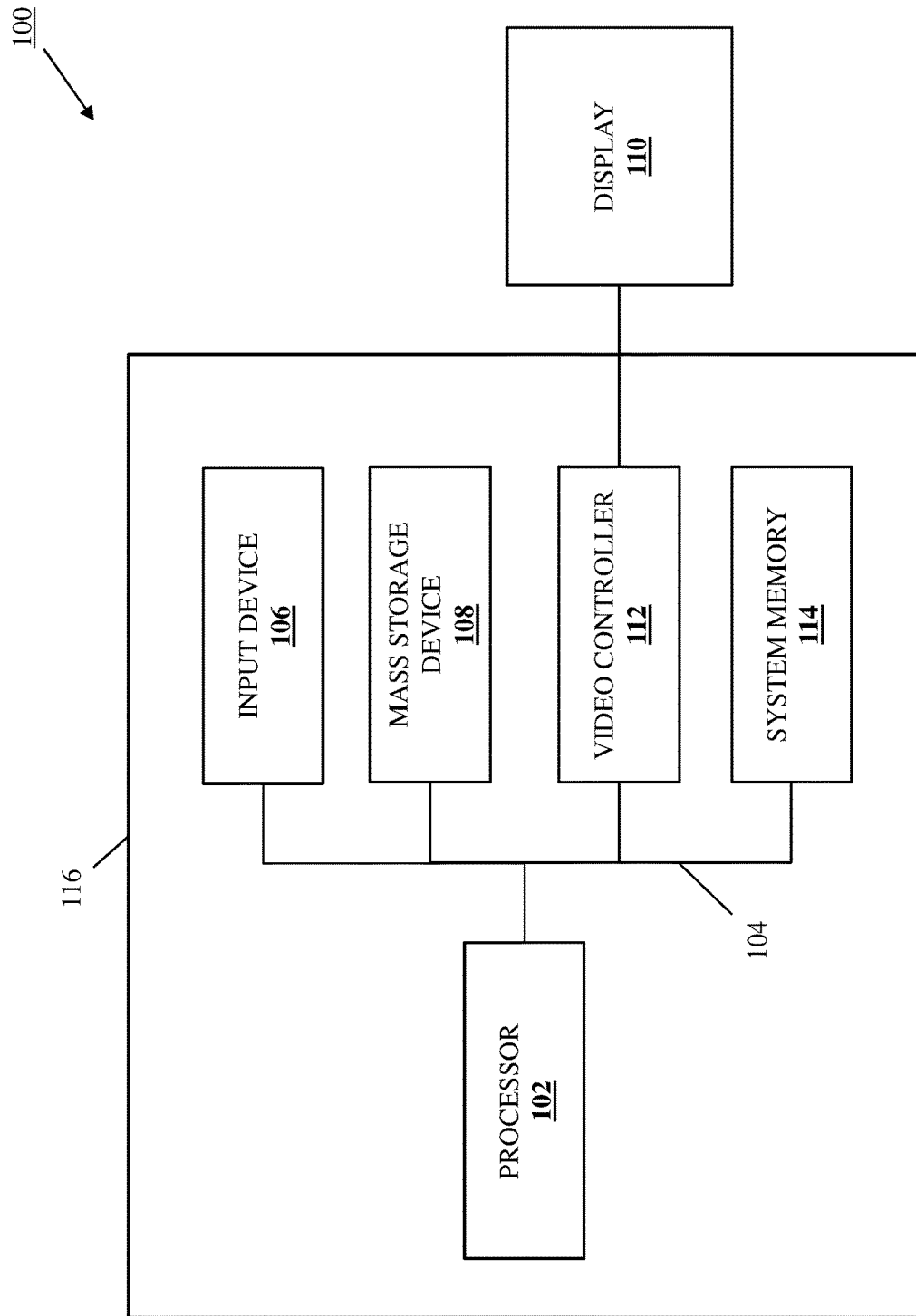
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
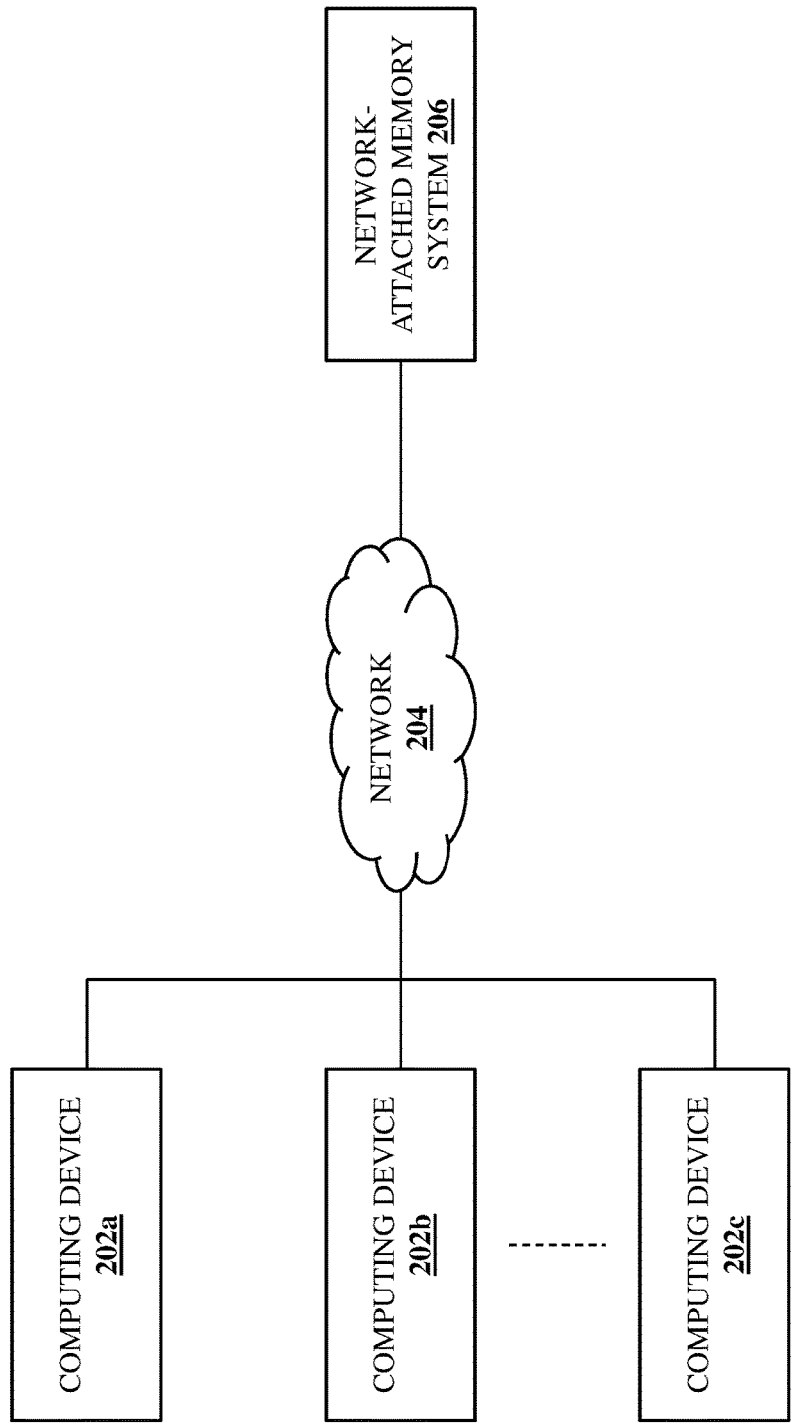
FIG. 2 is a schematic view illustrating an embodiment of a networked system that may include the tiered memory management system of the present disclosure.

Referring now to FIG. 2, an embodiment of a networked system 200 is illustrated that may include the tiered memory management system of the present disclosure. In the illustrated embodiment, the networked system 200 includes a plurality of computing devices 202a, 202b, and up to 202c. In an embodiment, any or each of the computing devices 202a-202c may be provided by the IHS 100 discussed above with reference to FIG. 1, and/or may include some or all of the components of the IHS 100, and in specific examples may be provided by server devices, desktop computing devices, laptop/notebook computing devices, tablet computing devices, or mobile phones. However, while illustrated and discussed as being provided by particular computing devices, one of skill in the art in possession of the present disclosure will recognize that computing devices provided in the networked system 200 may include any devices that may be configured to operate similarly as the computing devices 202a-202c discussed below.

In the illustrated embodiment, the computing devices 202a-202c are coupled to a network 204 that may be provided by a Local Area Network (LAN), the Internet, combinations thereof, and/or any other networks that would be apparent to one of skill in the art in possession of the present disclosure. In the illustrated embodiment, a network-attached memory system 206 is coupled to the computing devices 202a-202c via the network 204. In an embodiment, the network-attached memory system 206 may be provided by the IHS 100 discussed above with reference to FIG. 1, and/or may include some or all of the components of the IHS 100, and in specific examples may be provided by a storage system such as a Just a Bunch Of Flash (JBOF) storage system. However, while illustrated and discussed as being provided by a particular storage system, one of skill in the art in possession of the present disclosure will recognize that network-attached memory systems provided in the networked system 200 may include any devices that may be configured to operate similarly as the network-attached memory system 206 discussed below. However, while a specific networked system 200 has been illustrated and described, one of skill in the art in possession of the present disclosure will recognize that the tiered memory management system of the present disclosure may be provided using a variety of components and component configurations while remaining within the scope of the present disclosure as well.

Figure 3:
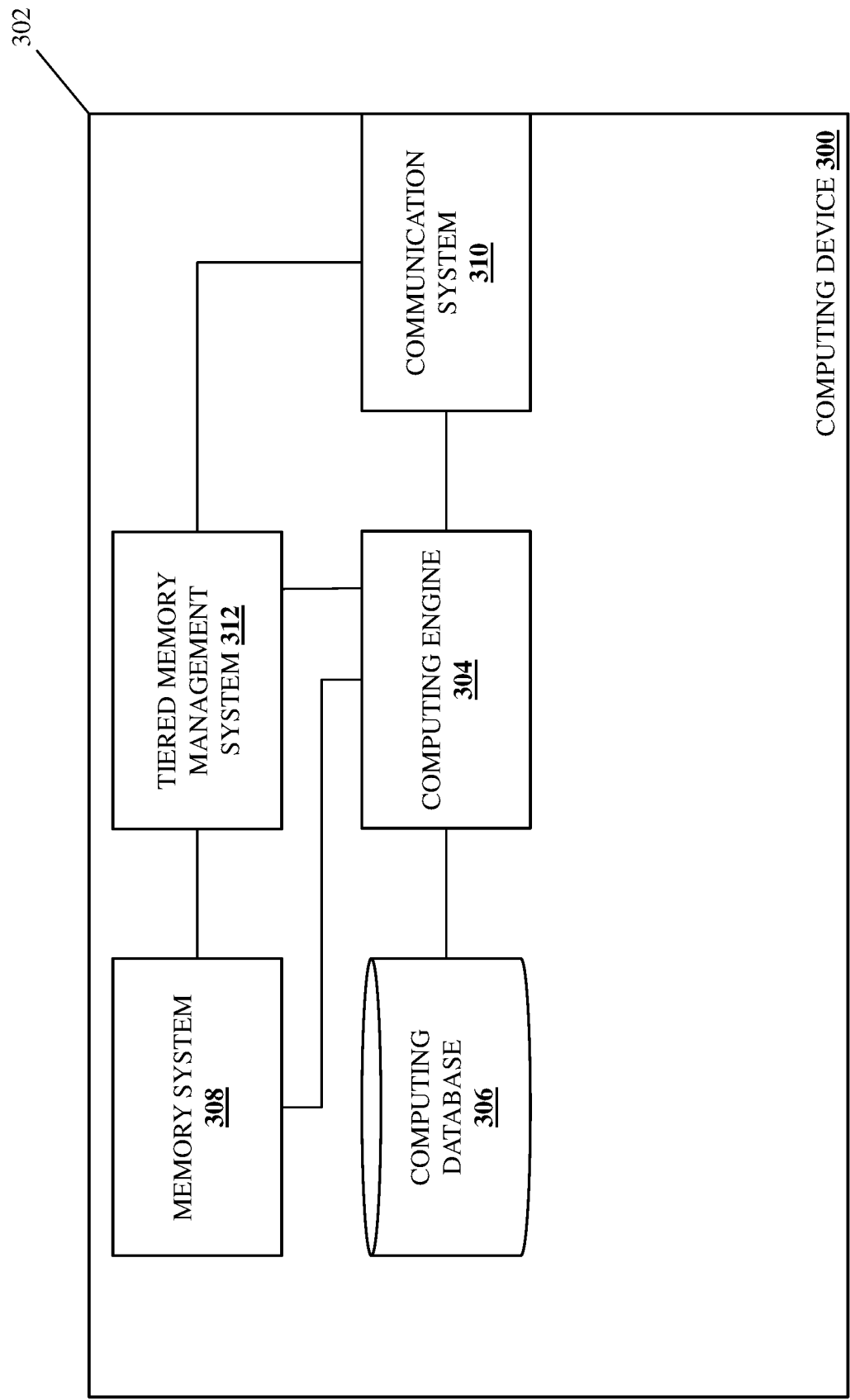
FIG. 3 is a schematic view illustrating an embodiment of a computing device that may be included in the networked system of FIG. 2 and that may include the tiered memory management system of the present disclosure.

Referring now to FIG. 3, an embodiment of a computing device 300 is illustrated that may provide any of the computing devices 202a-202c discussed above with reference to FIG. 2. As such, the computing device 300 may be provided by the IHS 100 discussed above with reference to FIG. 1 and/or may include some or all of the components of the IHS 100, and in specific examples may be provided by server devices, desktop computing devices, laptop/notebook computing devices, tablet computing devices, or mobile phones. Furthermore, while illustrated and discussed as being provided by particular computing devices, one of skill in the art in possession of the present disclosure will recognize that the functionality of the computing device 300 discussed below may be provided by other devices that are configured to operate similarly as the computing device 300 discussed below. In the illustrated embodiment, the computing device 300 includes a chassis 302 that houses the components of the computing device 300, only some of which are illustrated and discussed below. For example, the chassis 302 may house a processing system (not illustrated, but which may include the processor 102 discussed above with reference to FIG. 1) and a memory subsystem (not illustrated, but which may include the memory 114 discussed above with reference to FIG. 1) that is coupled to the processing system and that includes instructions that, when executed by the processing system, cause the processing system to provide a computing engine 304 that is configured to perform the functionality of the computing engines and/or computing devices discussed below.

The chassis 302 may also house a storage system (not illustrated, but which may include the storage 108 discussed above with reference to FIG. 1) that is coupled to the computing engine 304 (e.g., via a coupling between the storage system and the processing system) and that includes a computing database 306 that is configured to store any of the information utilized by the computing engine 304 discussed below. The chassis 302 may also house a memory system 308 that is coupled to the computing engine 304 (e.g., via a coupling between the memory system 308 and the processing system). As will be appreciated by one of skill in the art in possession of the present disclosure, the memory system 308 may include the memory subsystem discussed above that are used by the processing system to provide the computing engine 304, as well as any of a variety of other memory subsystems that would be apparent one of skill in the art in possession of the present disclosure. For example, the memory system 308 may include On-Package Memory (OPM) subsystems, direct Dynamic Random Access Memory (DRAM) subsystems, local Compute eXpress Link (CXL) DRAM subsystems, local CXL persistent DRAM subsystems, local Non-Volatile Memory express (NVMe) memory subsystems discussed in the specific embodiments described below, as well as other "local" memory subsystem that would be apparent to one of skill in the art in possession of the present disclosure.

The chassis 302 may also house a communication system 310 that is coupled to the computing engine 304 (e.g., via a coupling between the communication system 310 and the processing system) and that may be provided by a Network Interface Controller (NIC), wireless communication systems (e.g., BLUETOOTH®, Near Field Communication (NFC) components, WiFi components, etc., and/or any other communication components that would be apparent to one of skill in the art in possession of the present disclosure. In the illustrated embodiment, the chassis 302 also houses a tiered memory management system 312, discussed in further detail below with reference to FIG. 4, that is coupled to the memory system 308, the computing engine 304 (e.g., via a coupling between the tiered memory management system 312 and the processing system), and the communication system 310. In an embodiment, the tiered memory management system 312 may be provided by the IHS 100 discussed above with reference to FIG. 1, and/or may include some or all of the components of the IHS 100.

In a specific example, the tiered memory management system 312 may be provided using software in a memory management system for the memory system 308, a hypervisor provided by the computing engine 304, an operating system provided by the computing engine 304, and/or other software enabled systems in the computing device 300. As such, the tiered memory management system 312 may be provided using hardware such as a co-processor, an Application Specific Integrated Circuit (ASIC), a Field Programmable Gate Array (FPGA), a Central Processing Unit (CPU), and/or other hardware subsystem that has access (e.g., control plane access) to Direct Memory Access (DMA) engines, memory devices, and/or other hardware/software that one of skill in the art in possession of the present disclosure would recognize as enabling the functionality described below.

However, while the tiered memory management system 312 is illustrated and described as being included in the computing device 300, one of skill in the art in possession of the present disclosure will appreciate how the tiered memory management system of the present disclosure may be coupled to any of the computing devices 202a-202c/300 via the network 204 (e.g., as a stand-alone device, as part of the network-attached memory system 206, included in a different computing device 202a-202c/300, etc.) while remaining within the scope of the present disclosure as well. As such, while a specific computing device 300 has been illustrated and described, one of skill in the art in possession of the present disclosure will recognize that computing devices (or other devices operating according to the teachings of the present disclosure in a manner similar to that described below for the computing device 300) may include a variety of components and/or component configurations for providing conventional computing device functionality, as well as the functionality discussed below, while remaining within the scope of the present disclosure as well.

Figure 4:
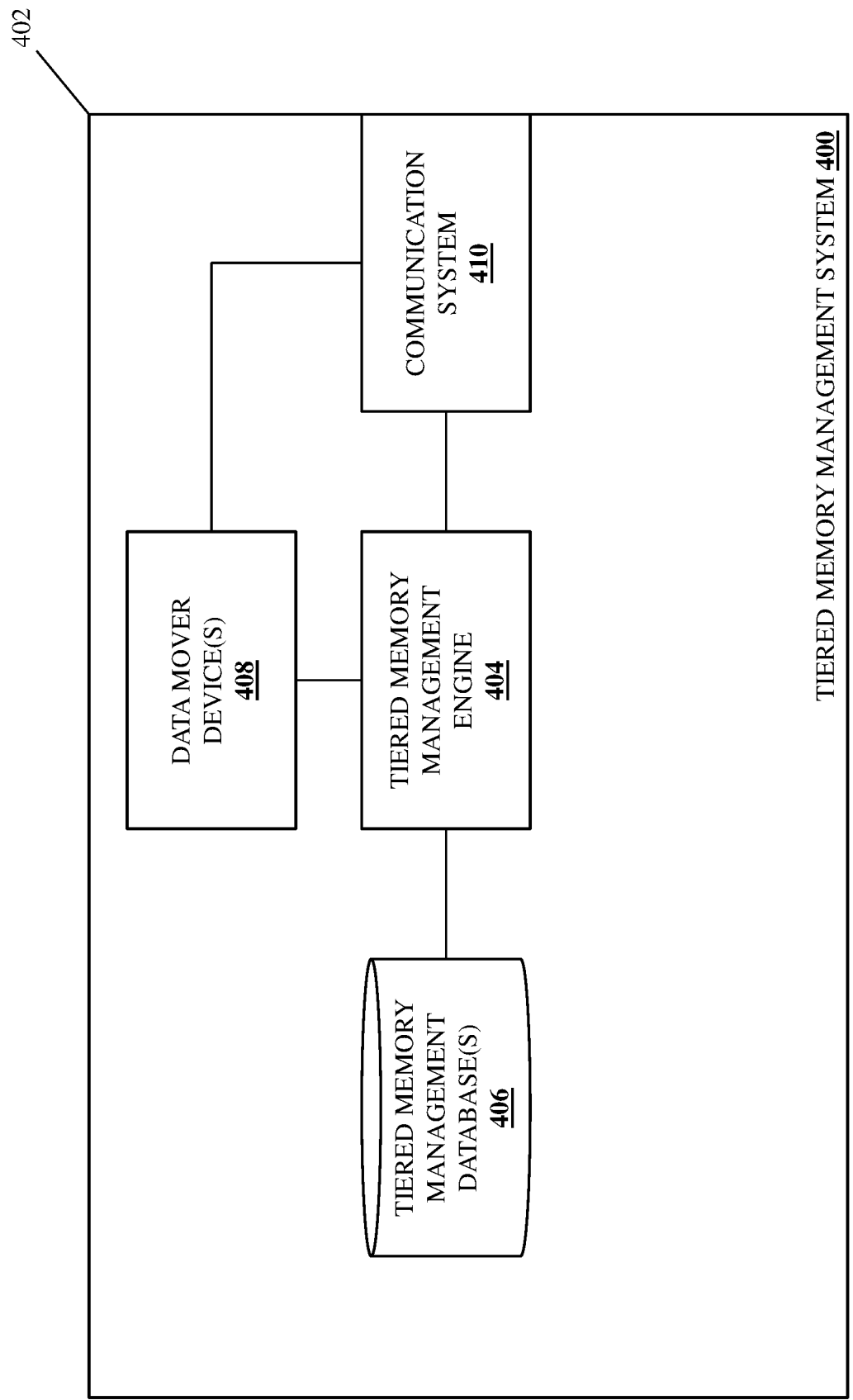
FIG. 4 is a schematic view illustrating an embodiment of a tiered memory management system that may be included in the computing device of FIG. 3 and that may be provided according to the teachings of the present disclosure.

Referring now to FIG. 4, an embodiment of a tiered memory management system 400 is illustrated that may provide the tiered memory management system 312 discussed above with reference to FIG. 3. As such, the tiered memory management system 400 may be provided by the IHS 100 discussed above with reference to FIG. 1 and/or may include some or all of the components of the IHS 100. In the illustrated embodiment, the tiered memory management system 400 includes a chassis 402 that houses the components of the tiered memory management system 400, only some of which are illustrated and discussed below. In embodiments in which the tiered memory management system 400 is included in the computing device 300 of FIG. 3, the chassis 402 may be provided by a circuit board that supports the components of the tiered memory management system 400 (e.g., a motherboard in the computing device 300, a circuit board that is configured to couple to a motherboard in the computing device 300, etc., while in embodiments in which the tiered memory management system 400 is provided by a stand-alone device or otherwise outside of the computing device 300 of FIG. 3, the chassis 402 may house the components of the tiered memory management system 400.

As such, the chassis 402 may support/house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a tiered memory management engine 404 that is configured to perform the functionality of the tiered memory management engines and/or tiered memory management systems discussed below. Similarly as discussed above, the tiered memory management engine 404 may be provided using software in a memory management system for a memory system, a hypervisor, an operating system, and/or other software enabled systems that would be apparent to one of skill in the art in possession of the present disclosure. As such, the tiered memory management engine 404 may be provided using hardware such as a co-processor, an ASIC, an FPGA, a CPU, and/or other hardware subsystem that has access (e.g., control plane access) to DMA engines, memory devices, and/or other hardware/software that one of skill in the art in possession of the present disclosure would recognize as enabling the functionality described below The chassis 402 may also support/house a storage system (not illustrated, but which may include the storage 108 discussed above with reference to FIG. 1) that is coupled to the tiered memory management engine 404 (e.g., via a coupling between the storage system and the processing system) and that includes one or more tiered memory management databases 406 that are configured to store any of the information utilized by the tiered memory management engine 404 discussed below. The chassis 402 may also support/house a communication system 408 that is coupled to the tiered memory management engine 404 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure.

The chassis 402 may also support/house one or more data mover devices 408 that are coupled to the tiered memory management engine 404 (e.g., via a coupling between the data mover device(s) 408 and the processing system) and to the communication system 410. However, while the data mover device(s) 408 are described as being supported/housed by the chassis 402 of the tiered memory management system 400, one of skill in the art in possession of the present disclosure will appreciate how the data mover device(s) 408 may be included in the computing device 300 and coupled to the tiered memory management system 400, coupled to the tiered memory system 400 via the network 204, and/or other accessible to the tiered memory management engine 404 in a variety of other manners that will fall within the scope of the present disclosure. As such, while a specific tiered memory management system 400 has been illustrated and described, one of skill in the art in possession of the present disclosure will recognize that tiered memory management systems (or other devices operating according to the teachings of the present disclosure in a manner similar to that described below for the tiered memory management system 400) may include a variety of components and/or component configurations for providing conventional functionality, as well as the functionality discussed below, while remaining within the scope of the present disclosure as well.

Figure 5:
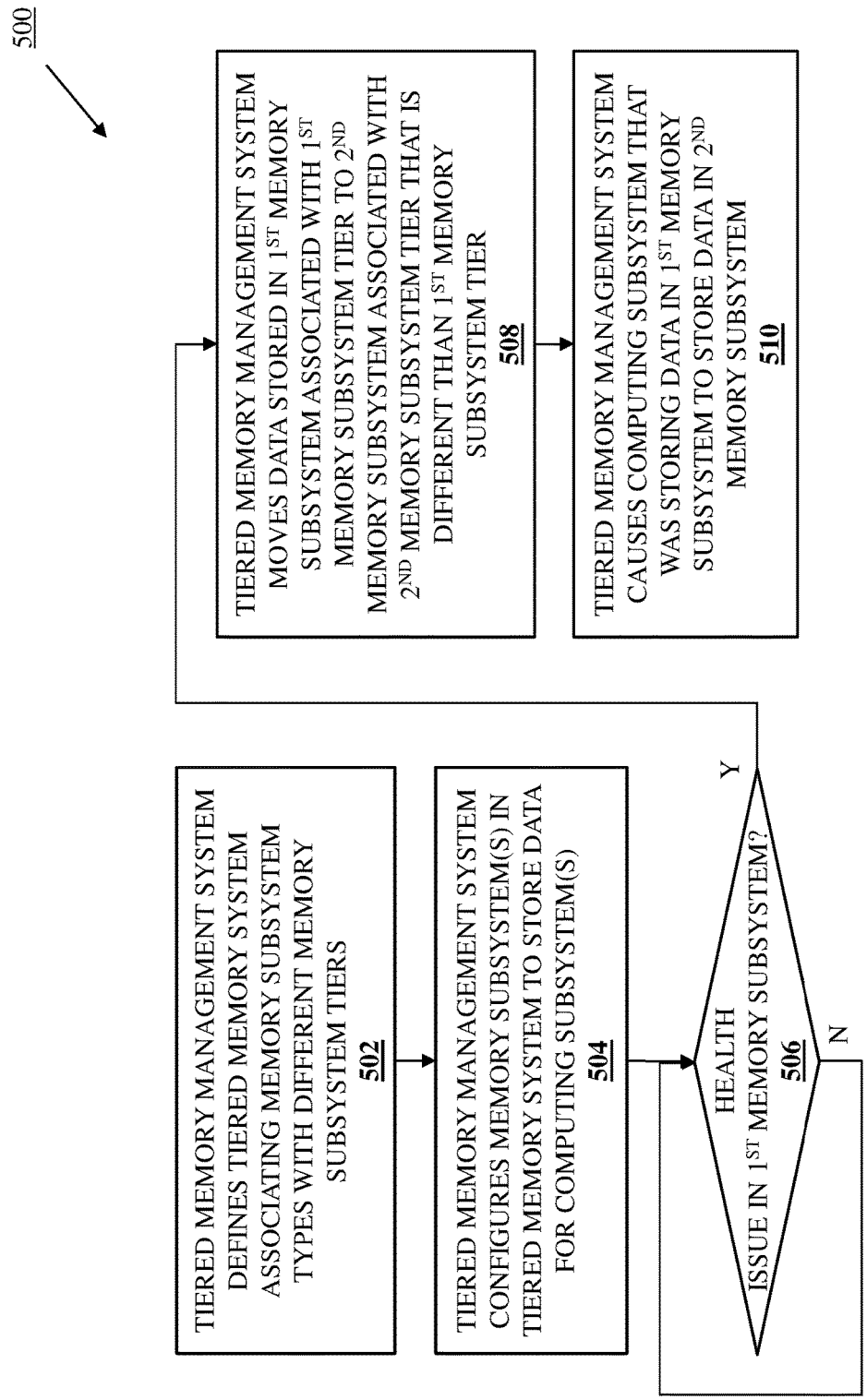
FIG. 5 is a flow chart illustrating an embodiment of a method for managing tiered memory.

Referring now to FIG. 5, an embodiment of a method 500 for managing tiered memory is illustrated. As discussed below, the systems and methods of the present disclosure provide for the management of memory subsystems in a tiered memory system in a manner that allows the preemptive removal of failing memory subsystems without interruption of the computing subsystems using them, as well as the alleviation of uneven wear patterns memory subsystems that are part of a memory subsystems tier. For example, the tiered memory management system of the present disclosure may be coupled to a first memory subsystem associated with a first memory subsystem tier, and a second memory subsystem associated with a second memory subsystem tier that is different than the first memory subsystem tier. The tiered memory management system monitors a health of the first memory subsystem associated with the first memory subsystem tier and the second memory subsystem associated with the second memory subsystem tier. When the tiered memory management system identifies a health issue with the first memory subsystem associated with the first memory subsystem tier, it moves data stored in the first memory subsystem associated with the first memory subsystem tier to the second memory subsystem associated with the second memory subsystem tier. As such, failure issues present in conventional tiered memory systems are eliminated.

Figure 6:
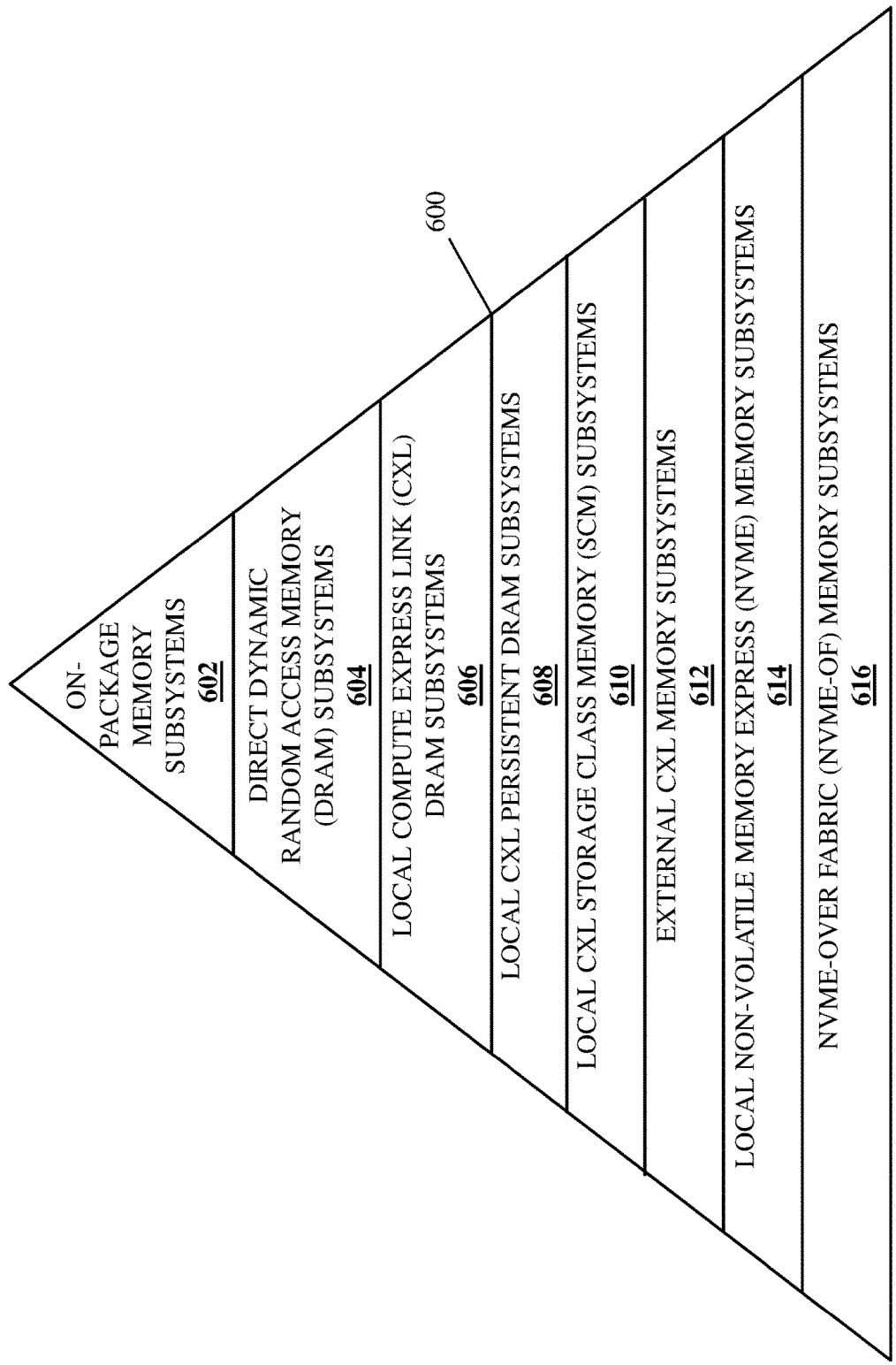
FIG. 6 is a schematic view illustrating an embodiment of tiered memory system that may be provided during the method of FIG. 5.

The method 500 begins at block 502 where a tiered memory management system defines a tiered memory system associating memory subsystem types with different memory subsystem tiers. In an embodiment, at block 502, the tiered memory management engine 404 in the tiered memory management system 312/400 may define a tiered memory system for the computing device 300 that associates memory subsystem types with different memory subsystem tiers. With reference to FIG. 6, a tiered memory system 600 is illustrated that includes a plurality of memory subsystem tiers for respective memory subsystem types of memory subsystems that may be accessible to the computing device 202a/300 (e.g., accessible to the computing engine 304 in the computing device 202a/300 for the storage and utilization of data, as well as other memory subsystems functionality that would be apparent to one of skill in the art in possession of the present disclosure). As will be appreciated by one of skill in the art in possession of the present disclosure, while the tiered memory system 600 is described as being defined for a single computing device 202a/300, similar tiered memory systems may be defined for the other computing devices 202b and up to 202c in the networked system 200 while remaining within the scope of the present disclosure.

As illustrated, the tiered memory system 600 includes a first memory subsystem tier 602 that is associated with on-package memory subsystems that may be included in the memory system 308 of the computing device 202a/300 and that may be provided by, for example, on-package High Bandwidth Memory (HBM) devices defined by Joint Electron Device Engineering Council (JEDEC) standards and including Dynamic Random Access Memory (DRAM) memory technology using Through-Silicon Vias (TSVs) to interconnect stacked DRAM die, as well as other on-package memory subsystems that would be apparent to one of skill in the art in possession of the present disclosure. The tiered memory system 600 also includes a second memory subsystem tier 604 that is associated with direct DRAM subsystems that may be included in the memory system 308 of the computing device 202a/300 and that may be provided by, for example, Double Data Rate (DDR) memory devices and/or other direct DRAM subsystems that would be apparent to one of skill in the art in possession of the present disclosure. The tiered memory system 600 also includes a third memory subsystem tier 606 that is associated with local Compute express Link (CXL) DRAM subsystems that may be included in the memory system 308 of the computing device 202a/300.

The tiered memory system 600 also includes a fourth memory subsystem tier 608 that is associated with local CXL persistent DRAM subsystems that may be included in the memory system 308 of the computing device 202a/300. The tiered memory system 600 also includes a fifth memory subsystem tier 610 that is associated with local CXL Storage Class Memory (SCM) subsystems that may be included in the memory system 308 of the computing device 202a/300 and that may be provided by, for example, OPTANE® memory devices available from INTEL® corporation of Redmond, Washington, United States, as well as other local CXL SCM subsystems that would be apparent to one of skill in the art in possession of the present disclosure. The tiered memory system 600 also includes a sixth memory subsystem tier 612 that is associated with external CSL memory subsystems that may be included in the computing devices 202b-202c and accessible to the computing device 202a/300, and that may be provided by, for example, OPTANE® memory devices available from INTEL® corporation of Redmond, Washington, United States; DRAM devices; SCM devices; and/or other external CXL memory subsystems that would be apparent to one of skill in the art in possession of the present disclosure.

The tiered memory system 600 also includes a seventh memory subsystem tier 614 that is associated with local Non-Volatile Memory express (NVMe) memory subsystems that may be included in the computing device 202a, and that may be provided by, for example, OPTANE® memory devices available from INTEL® corporation of Redmond, Washington, United States; NAND memory devices in NVMe Solid State Drive (SSD) storage device; and/or other local NVMe memory subsystems that would be apparent to one of skill in the art in possession of the present disclosure. The tiered memory system 600 also includes an eighth memory subsystem tier 616 that is associated with (NVMe) over Fabric (NVMe-oF) memory subsystems that may be included in the network-attached memory system 206 and accessible to the computing device 202a via the network 204, and that may be provided by, for example, OPTANE® memory devices available from INTEL® corporation of Redmond, Washington, United States; NAND memory devices in NVMe Solid State Drive (SSD) storage devices; and/or other NVMe-OF memory subsystems that would be apparent to one of skill in the art in possession of the present disclosure.

As discussed above, the different memory subsystem tiers in a tiered memory system may be ranked relative to each other based on cost factors, availability factors, performance factors, capability factors, and/or other tiered memory subsystem factors that would be apparent to one of skill in the art in possession of the present disclosure. For example, performance factors used to rank different memory subsystem tiers in a tiered memory system may include memory subsystem latency, memory subsystem bandwidth, memory subsystem power consumption, memory subsystem write endurance, and/or other performance factors that would be apparent to one of skill in the art in possession of the present disclosure. In another example, capability factors used to rank different memory subsystem tiers in a tiered memory system may include data recovery capabilities of memory subsystems, Reliability/Availability/Serviceability (RAS) capabilities of memory subsystems, data persistence capabilities of memory subsystems, metadata support capabilities of memory subsystems, and/or other capabilities factors that would be apparent to one of skill in the art in possession of the present disclosure.

As such, one of skill in the art in possession of the present disclosure will appreciate how tiered memory system 600 illustrated in FIG. 6 ranks its memory subsystem tiers 602, 604, 606, 608, 610, 612, 614, and 616 with the first memory subsystem tier 602 as the "highest" tier, the second memory subsystem tier 604 as the second "highest" tier, the third memory subsystem tier 606 as the third "highest" tier, the fourth memory subsystem tier 608 as the fourth "highest" tier, the fifth memory subsystem tier 610 as the fifth "highest" tier, the sixth memory subsystem tier 612 as the sixth "highest" tier, the seventh memory subsystem tier 614 as the seventh "highest" tier, and the eighth memory subsystem tier 616 as the "lowest" tier. However, while a specific tiered memory system with specific memory subsystem types ranked in specific memory subsystem tiers is illustrated and described herein, one of skill in the art in possession of the present disclosure will appreciate how tiered memory systems, memory subsystems tiers, and memory subsystem types may differ depending on the tiered memory system configuration, priorities, and/or other factors while remaining within the scope of the present disclosure as well.

Figure 7A:
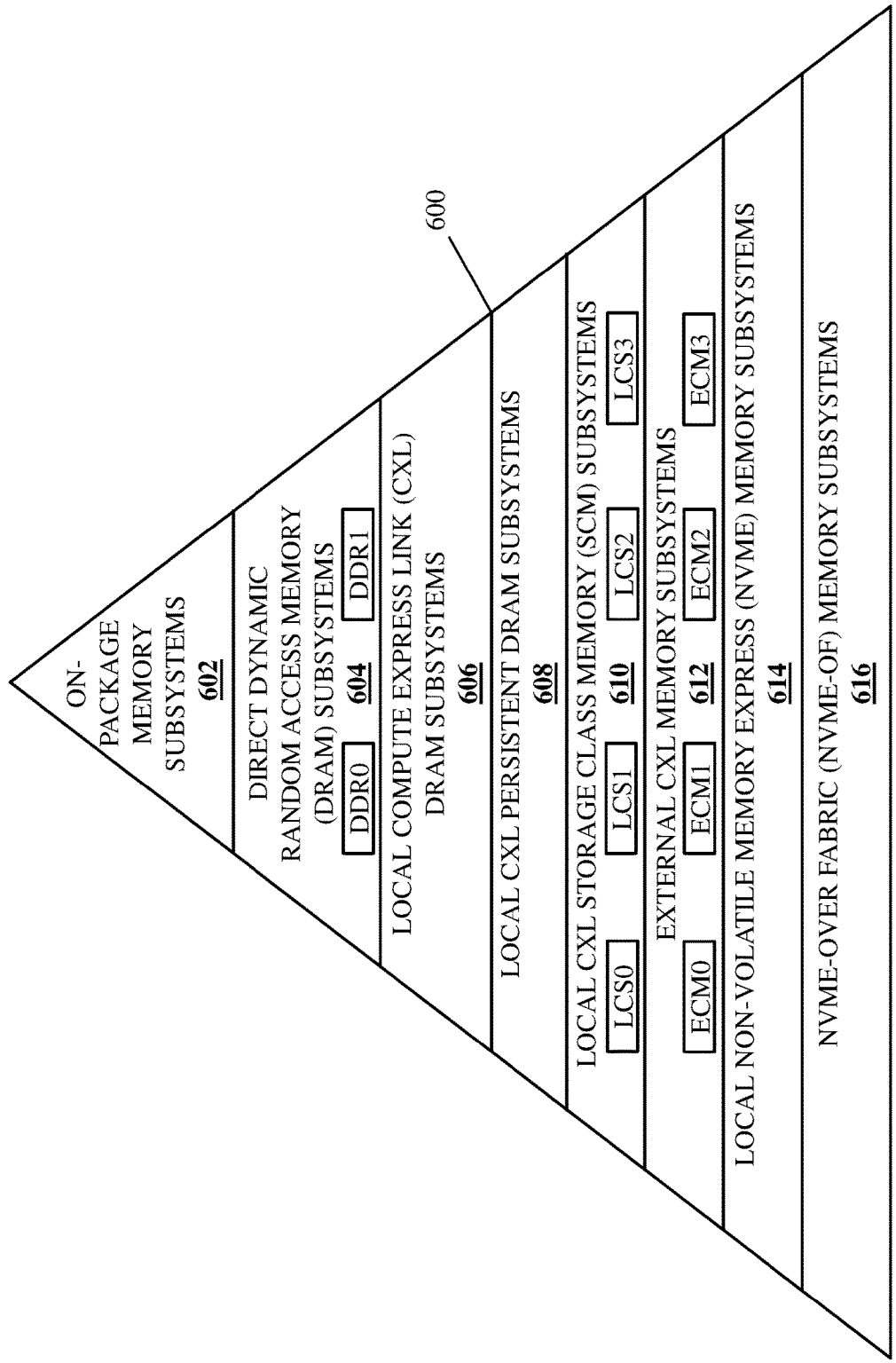
FIG. 7A is a schematic view illustrating an embodiment of memory subsystems that may be available in the tiered memory system of FIG. 6 during the method of FIG. 5.

The method 500 then proceeds to block 504 where the tiered memory management system configures one or more memory subsystems in the tiered memory system to store data for one or more computing subsystems. In an embodiment, at block 504, the tiered memory management engine 404 in the tiered memory management system 312/400 may configure memory subsystem(s) in the memory system 308 of the computing devices 202a/300, in the computing devices 202b-202c, and/or in the network-attached memory system 206 to store data for one or more computing subsystems provided by the computing engine 304. With reference to FIG. 7A, in the examples illustrated and described below, the computing engine 304 has access to DDR memory subsystems DDR0 and DDR1 that, as discussed above, are provided by the memory system 308 and included in the second memory subsystem tier 604 of the tiered memory system 600 that is associated with direct DRAM subsystems; Local CXL SCM memory subsystems LCS0, LCS1, LCS2, and LCS3 that, as discussed above, are provided by the memory system 308 and included in the fifth memory subsystem tier 610 of the tiered memory system 600; and External CXL memory subsystems ECM0, ECM1, ECM2, and ECM3 that, as discussed above, are provided in the computing devices 202b-202c and included in the sixth memory subsystem tier 612 of the tiered memory system 600.

To provide a specific example, the computing subsystems provided by the computing engine 202a/300 may include an operating system and/or one or more applications, although other computing subsystems that utilize memory subsystems will fall within the scope of the present disclosure as well. In some embodiments, at block 504, the tiered memory management engine 404 in the tiered memory management system 312/400 may define a plurality of logical memory address spaces such as, for example, "bins" that represent the granularity at which the tiered memory management engine 404 and/or the data mover device(s) 408 operate, and/or any other logical memory addresses spaces that would be apparent to one of skill in the art in possession of the present disclosure. The tiered memory management engine 404 may then assign subsets of the logical memory address spaces to one or more computing subsystems provided by the computing engine 304 (e.g., assign a first subset of the logical memory address spaces to an operating system, assign a second subset of the logical memory address spaces to a first application, assign a third subset of the logical memory address spaces to a second application, and so on).

The tiered memory management engine 404 in the tiered memory management system 312/400 may then associate each logical memory address space with one or more of the plurality of memory subsystems, and one of skill in the art in possession of the present disclosure will appreciate how the association of any logical memory address space with memory subsystem(s) may be based, at least in part, on the computing subsystem that was assigned that logical memory address space, the data provided for storage by the computing subsystem that was assigned that logical memory address space, the memory subsystem tier in which that memory subsystem is included, as well as any other memory subsystem/logical address space association factors that would be apparent to one of skill in the art in possession of the present disclosure. For example, any logical memory address space may be associated with a memory subsystem in a memory subsystem tier that includes characteristics desired for the data that will be stored in that logical memory address space by the computing subsystem to which it is assigned.

With reference to FIG. 7B, a logical memory address space/memory subsystem association table 700 is illustrated that may be stored in the tiered memory management database(s) 406 and that includes a logical memory address space column 702 and a physical memory subsystem column 704, and one of skill in the art in possession of the present disclosure will appreciate how the logical memory address space/memory subsystem association table 700 may be used by the tiered memory management engine 404 to associate logical memory address spaces with memory subsystems as discussed above.

For example, as illustrated in FIG. 7B, at block 504 the tiered memory management engine 404 in the tiered memory management system 312/400 may have associated each of: a logical memory address space 0 with the DDR0 memory subsystem that is included in the second memory subsystem tier 604, a logical memory address space 1 with the LCS2 memory subsystem that is included in the fifth memory subsystem tier 610, a logical memory address space 2 with the DDR1 memory subsystem that is included in the second memory subsystem tier 604, a logical memory address space 3 with the LCS0 memory subsystem that is included in the fifth memory subsystem tier 610, a logical memory address space 4 with the ECM2 memory subsystem that is included in the sixth memory subsystem tier 612, a logical memory address space 5 with the DDR1 memory subsystem that is included in the second memory subsystem tier 604, a logical memory address space 6 with the DDR1 memory subsystem that is included in the second memory subsystem tier 604, a logical memory address space 7 with the LCS0 memory subsystem that is included in the fifth memory subsystem tier 610, a logical memory address space 8 with the ECM3 memory subsystem that is included in the sixth memory subsystem tier 612, a logical memory address space 9 with the LCS2 memory subsystem that is included in the fifth memory subsystem tier 610, and a logical memory address space 10 with the LCS3 memory subsystem that is included in the fifth memory subsystem tier 610.

As such, one of skill in the art in possession of the present disclosure will appreciate how the assignment of logical memory address space(s) to a computing subsystem and the association of any of those logical memory address space(s) with a memory subsystem will configure that memory subsystem to store data for that computing subsystem. However, while a specific example of the configuration of memory subsystems to store data for computing subsystems has been illustrated and described, one of skill in the art in possession of the present disclosure will appreciate how other techniques for configuring the memory subsystems to store data for computing subsystems will fall within the scope of the present disclosure as well. As will be appreciated by one of skill in the art in possession of the present disclosure, following block 504, the computing subsystems in the computing device 202*a*/300 may operate to store and utilize data in the memory subsystems associated with their assigned logical memory address spaces.

The method 500 then proceeds to decision block 506 where it is determined whether a health issue exists in a first memory subsystem. In an embodiment, at decision block 506, the tiered memory management engine 404 in the tiered memory management system 312/400 may monitor the plurality of memory subsystems utilized in the tiered memory system 600 in order to determine whether a health issue exists in any of those memory subsystems. For example, the tiered memory management engine 604 may be configured to receive write telemetry data, error telemetry data, and/or other health telemetry data that would be apparent to one of skill in the art in possession of the present disclosure, from each of the memory subsystems utilized in the tiered memory system 600. At decision block 506, the tiered memory management engine 604 may analyze any health telemetry data received from any of the memory subsystems in the tiered memory system 600 in order to determine whether a health issue exists in that memory subsystem by, for example, determining whether that health telemetry data reaches or exceeds a threshold. However, while the use of thresholds to determine a health issue is described below, one of skill in the art in possession of the present disclosure will appreciate how the health issues discussed below may be determined using other techniques that will fall within the scope of the present disclosure as well.

For example, at decision block 506, the tiered memory management engine 404 in the tiered memory management system 312/400 may use the health telemetry data to determine whether a threshold number of errors have occurred in a memory subsystem, whether a threshold number of warnings have been received from a memory subsystem, whether a threshold number of write retries have been attempted to write data to a memory subsystem, to determine whether a memory subsystem includes a threshold number of "bad" pages, to determine whether a memory subsystem includes a threshold number of "bad" blocks (e.g., in an SCM memory subsystem, a flash memory subsystem, and/or other storage-device-like memory subsystem), to determine whether a memory subsystem had been written to a threshold number of times, to determine whether a memory subsystem has experienced a threshold number of correctable errors in a particular subset of the memory subsystem (e.g., a rank, page, or other subset of the memory subsystem), and/or to determine whether a variety of other thresholds have been reached that may be indicated of health issues in a memory subsystem. However, while the monitoring for several specific examples of health issues in memory subsystems have been described, one of skill in the art in possession of the present disclosure will appreciate how any of a variety of memory subsystem health issues may be monitored for at decision block 506 while remaining within the scope of the present disclosure.

If, at decision block 506, it is determined that a health issue does not exist in the first memory subsystem, the method 500 returns to decision block 506. As such, the method 500 may loop such that the tiered memory management engine 404 in the tiered memory management system 312/400 monitors the health of the memory subsystems while the computing subsystems in the computing device 202*a*/300 operate to store and utilize data in the memory subsystems associated with their assigned logical memory address spaces.

Figure 8A:
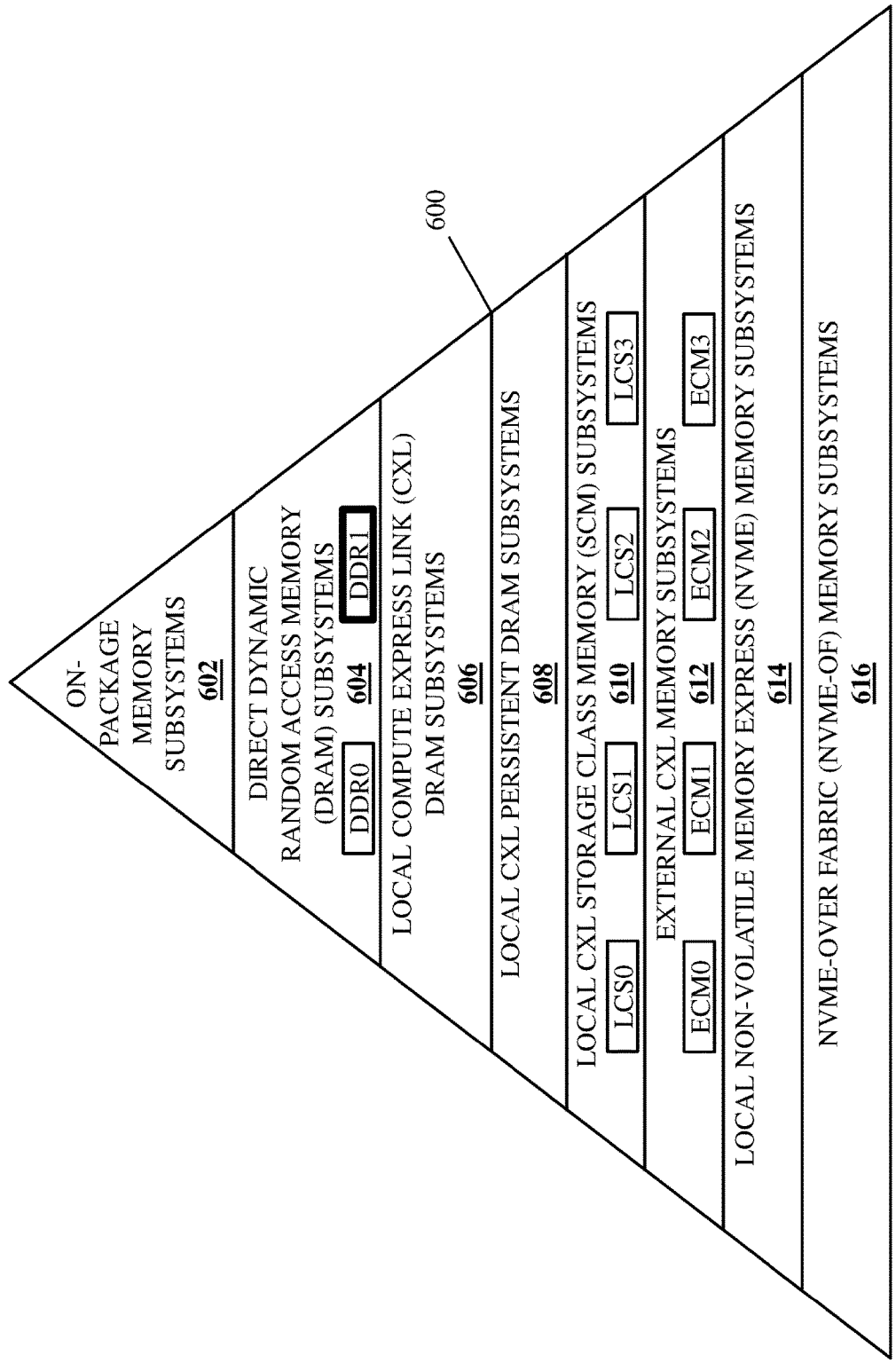
FIG. 8A is a schematic view illustrating an embodiment of the identification of a health issue in a memory subsystem available in the tiered memory system of FIG. 7A during the method of FIG. 5.

If, at decision block 506, it is determined that a health issue exists in the first memory subsystem, the method 500 proceeds to block 508 where the tiered memory management system moves data stored in the first memory subsystem associated with a first memory subsystem tier to a second memory subsystem associated with a second memory subsystem tier that is different than the first memory subsystem tier. With reference to FIG. 8A, in an embodiment of decision block 506, the tiered memory management engine 404 in the tiered memory management system 312/400 may determine that a health issue exists in the DDR1 memory subsystem that is included in the second memory subsystem tier 604 (e.g., as indicated by the bolded box in FIG. 8A). In this example of decision block 506, the tiered memory management engine 404 may determine that the DDR1 memory subsystem has reached a memory subsystem failure threshold in response to determining that a threshold number of errors have occurred in the DDR1 memory subsystem that is included in the second memory subsystem tier 604.

With reference to FIG. 8B, the tiered memory management engine 404 in the tiered memory management system 312/400 may use the logical memory address space/memory subsystem association table 700 to determine that the DDR1 memory subsystem in the second memory subsystem tier 604 that was determined to have reached the memory subsystem failure threshold at decision block 506 (e.g., as indicated by the bolded boxes in FIG. 8B) is associated with the logical memory address spaces 2 and 5. In an embodiment, at block 508 and in response to determining that the DDR memory subsystem in the second memory subsystem tier 604 has reached the memory subsystem failure threshold, the tiered memory management engine 404 in the tiered memory management system 312/400 may mark the data stored in the DDR1 memory subsystem in the second memory subsystem tier 604 for memory subsystem tier movement. Furthermore, in response to the data stored in the DDR1 memory subsystem being marked for memory subsystem tier movement, the data mover device(s) 408 may move the data stored in the DDR1 memory subsystem in the second memory subsystem tier 604 to the LCS2 memory subsystem in the fifth memory subsystem tier 610 and to the LCS3 memory subsystem in the fifth memory subsystem tier 610, as illustrated in FIG. 8C.

In different embodiments, the movement of the data from the DDR1 memory subsystem to the LCS2 and LCS3 memory subsystems in response to being marked for memory subsystem tier movement may be performed using a variety of tiered memory system data movement techniques that would be apparent to one of skill in the art in possession of the present disclosure. For example, one of skill in the art in possession of the present disclosure will appreciate how the marking of the data in the DDR1 memory subsystem for memory subsystem tier movement may include "demoting" the logical memory address spaces 2 and 5 associated with the DDR1 memory subsystem that has reached the memory subsystem failure threshold to a lower memory subsystem tier, and thus may result in the movement of the data stored in the logical memory address spaces 2 and 5 to memory subsystem(s) in lower memory subsystem tiers like the LCS2 and LCS3 memory subsystems in the fifth memory subsystem tier 610 in the illustrated examples. However, one of skill in the art in possession of the present disclosure will recognize how tiered memory system data movement techniques may be utilized to move the data stored in the logical memory address spaces 2 and 5 from the DDR1 memory subsystem to memory subsystem(s) in lower memory subsystem tiers, the same memory subsystem tier, and/or higher memory subsystem tiers (e.g., when such memory subsystems have available space) while remaining within the scope of the present disclosure as well.

Figure 8C:
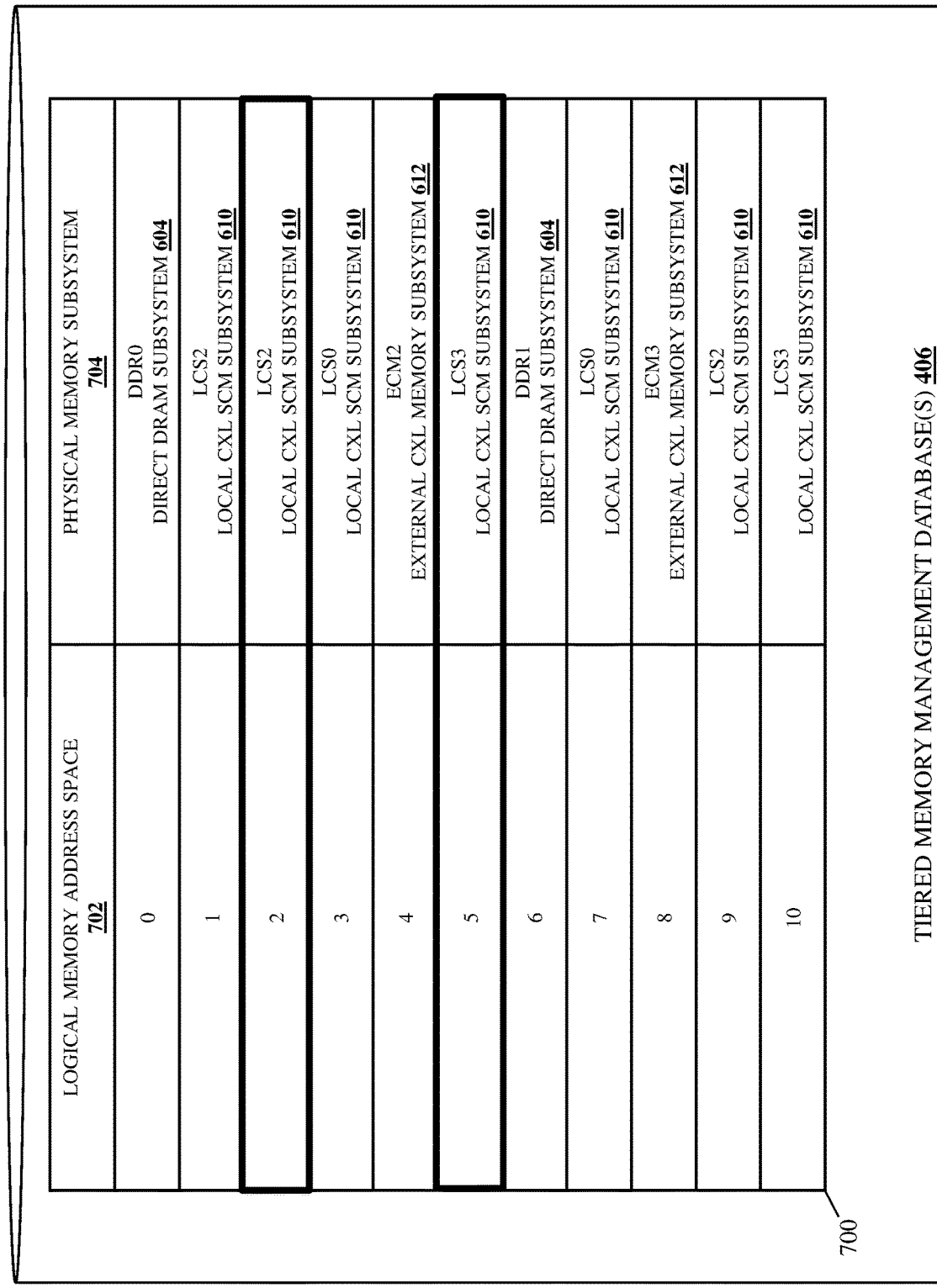
FIG. 8C is a schematic view illustrating an embodiment of the identification of data movement between memory subsystems in the tiered memory system of FIG. 7A during the method of FIG. 5.

As such, with reference to FIG. 8C, in an embodiment of block 508 and in response to the marking of the data stored in the logical memory address spaces 2 and 5 associated with the DDR1 memory subsystem that has reached the memory subsystem failure threshold, the data mover device(s) 408 may move that data from the DDR1 memory subsystem to the LCS2 and LCS3 memory subsystems. Thus, the marking of the data by the tiered memory management engine 404 may result in the disassociation of the logical memory address space 2 from the DDR1 memory subsystem in the second memory subsystem tier 604 and the association of that logical memory address space 2 with the LCS2 memory subsystem in the fifth memory subsystem tier 610, and may result in the disassociation of the logical memory address space 5 from the DDR1 memory subsystem in the second memory subsystem tier 604 and the association of that logical memory address space 5 with the LCS3 memory subsystem in the fifth memory subsystem tier 610.

The method 500 then proceeds to block 510 where the tiered memory management system causes the computing subsystem that was storing data in the first memory subsystem to store data in the second memory subsystem. With reference to FIG. 8D, in an embodiment of block 510 and following the moving of the data stored in the logical memory address spaces 2 and 5 from the DDR1 memory subsystem to the LCS2 and LCS3 memory subsystems, the tiered memory management engine 404 in the tiered memory management system 312/400 may identify the DDR1 memory subsystem as unavailable (as indicated by element 800 in FIG. 8D) to the computing subsystem(s) that were utilizing the DDR1 memory subsystem. As such, following block 510, those computing subsystems may store and utilize data in the LCS2 and LCS3 memory subsystems.

For example, when the computing device 300 is booted, initialized, or otherwise configured, the memory subsystems illustrated FIG. 8A may be identified as its physical address space (e.g., that includes the DDR0 memory subsystem, the DDR1 memory subsystem, the LCS0, LCS1 memory subsystem, the LCS2 memory subsystem, the LCS3 memory subsystem, the ECM0 memory subsystem, the ECM1 memory subsystem, the ECM2 memory subsystem, and the ECM3 memory subsystem). A logical address space may then be mapped to the physical address space as illustrated in FIG. 8B. As such, when the DDR1 memory subsystem fails or otherwise becomes unavailable, the tiered memory management system 312/400 may identify memory subsystems that are included in a lower tier and that include memory capacity that is not currently mapped to the logical address space. In this specific example, the LCS2 and LCS3 memory subsystems include memory capacity that is not currently mapped to the logical address space and thus may be mapped to the logical memory address spaces 2 and 5. As will be appreciated by one of skill in the art in possession of the present disclosure, in the event all the LCS devices are full, the tiered memory management system 312/400 may evict some logical memory addresses from the LCS2 and LCS3 memory subsystems to a subset of ECM memory subsystems to make spaces for the logical memory address spaces 2 and 5 in the LCS2 and LCS3 memory subsystems. In the event the ECM memory subsystems are also full, logical memory address space mapped to the ECM memory subsystems may be "paged out" in order to allow memory space to be swapped on a storage device.

As will be appreciated by one of skill in the art in possession of the present disclosure, following the movement of the data to the LCS2 and LCS3 memory subsystems, that data may be later moved to another memory subsystem tier as per conventional tiered memory system operations. For example, in the event the access frequency of that data reaches or exceeds a threshold, that data may be moved from the LCS2 and LCS3 memory subsystems in the fifth memory subsystem tier 610 to at least one memory subsystem in a higher memory subsystem tier in the tiered memory system 600, and one of skill in the art in possession of the present disclosure will appreciate how that data may be moved to at least one memory subsystem in a lower memory subsystem tier in a similar manner.

Figure 9A:
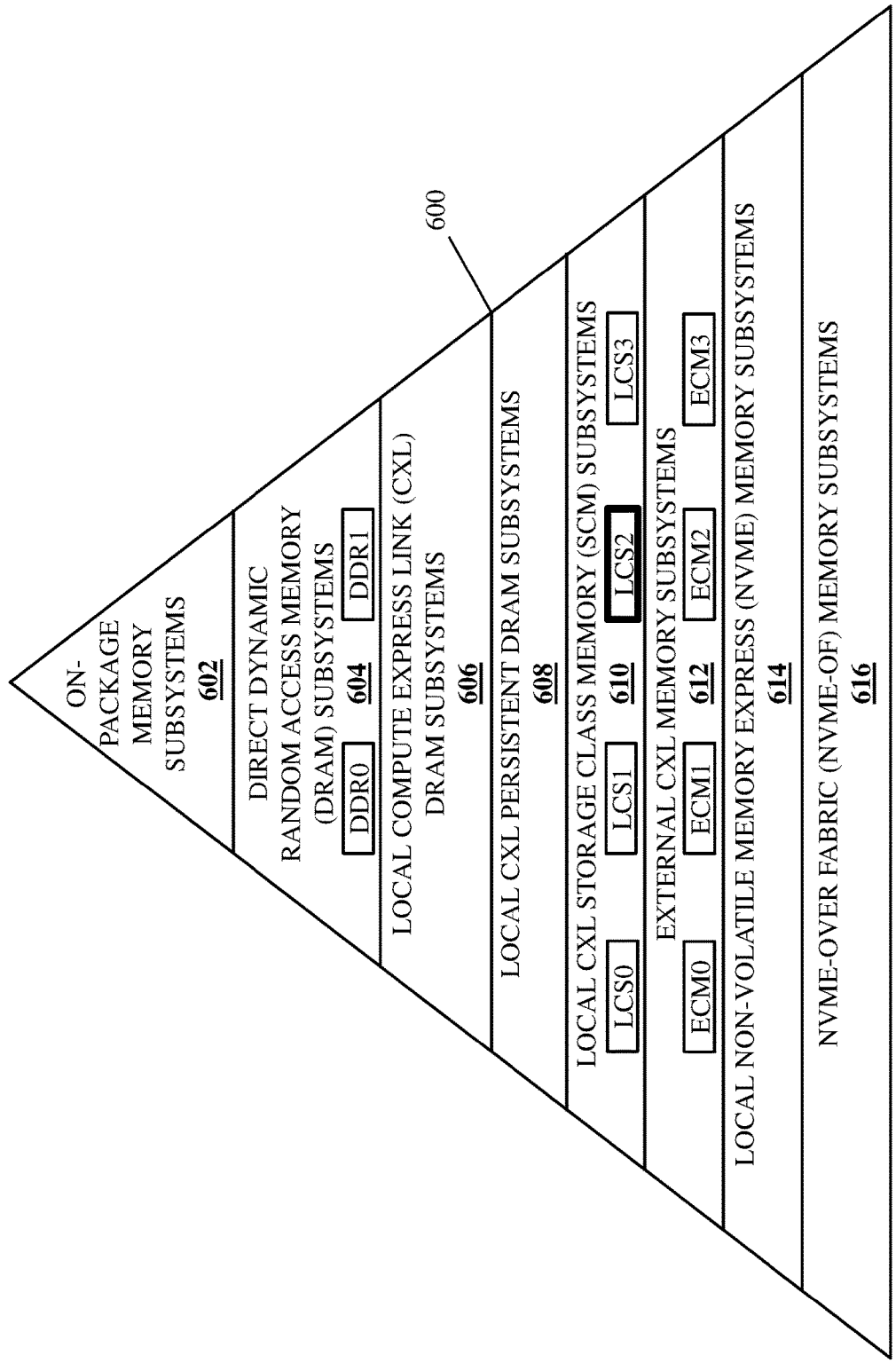
FIG. 9A is a schematic view illustrating an embodiment of the identification of a health issue in a memory subsystem available in the tiered memory system of FIG. 7A during the method of FIG. 5.
Figure 9B:
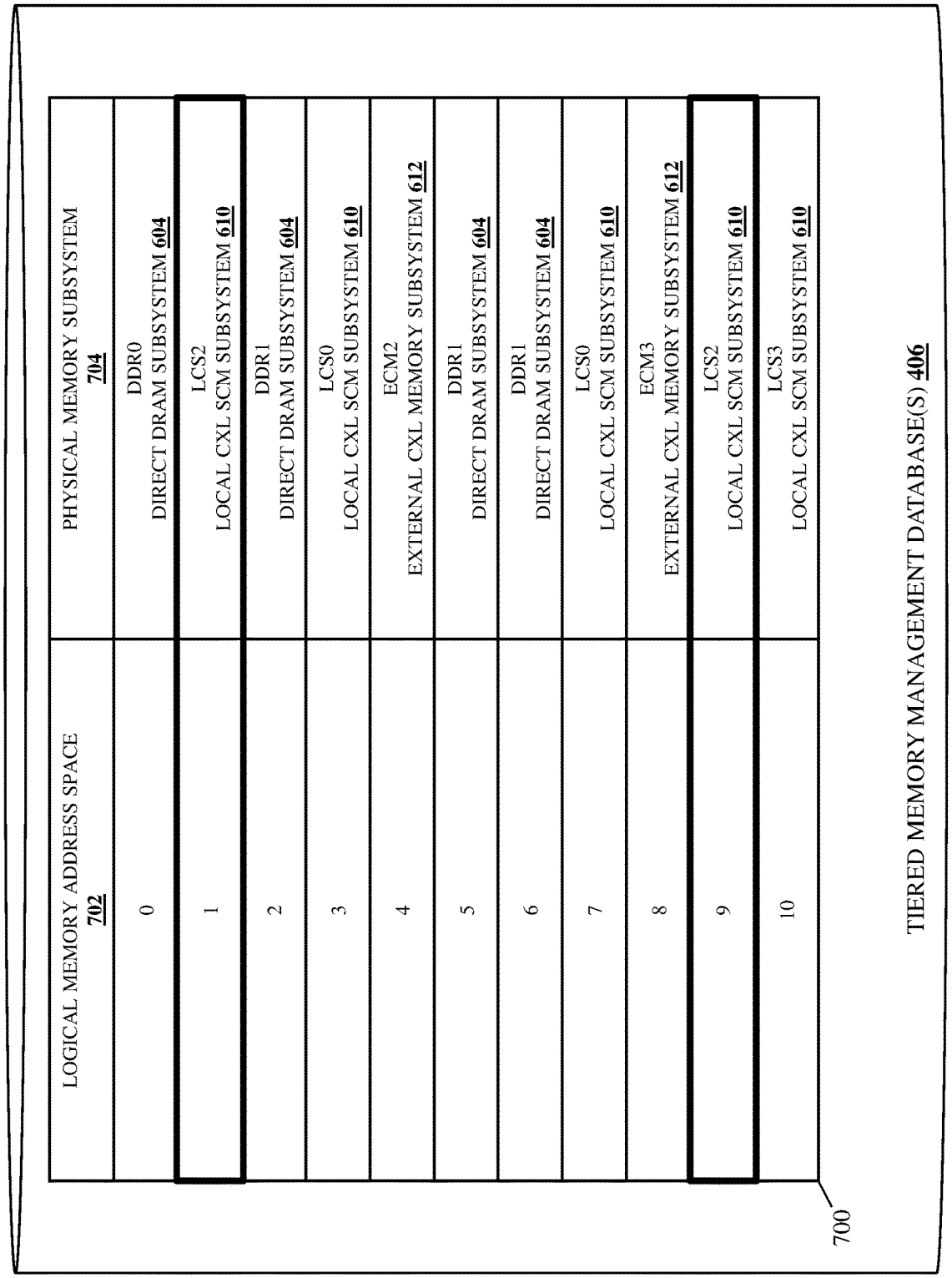
FIG. 9B is a schematic view illustrating an embodiment of the identification of data stored in the memory subsystem identified with the health issues of FIG. 9A during the method of FIG. 5.
Figure 9C:
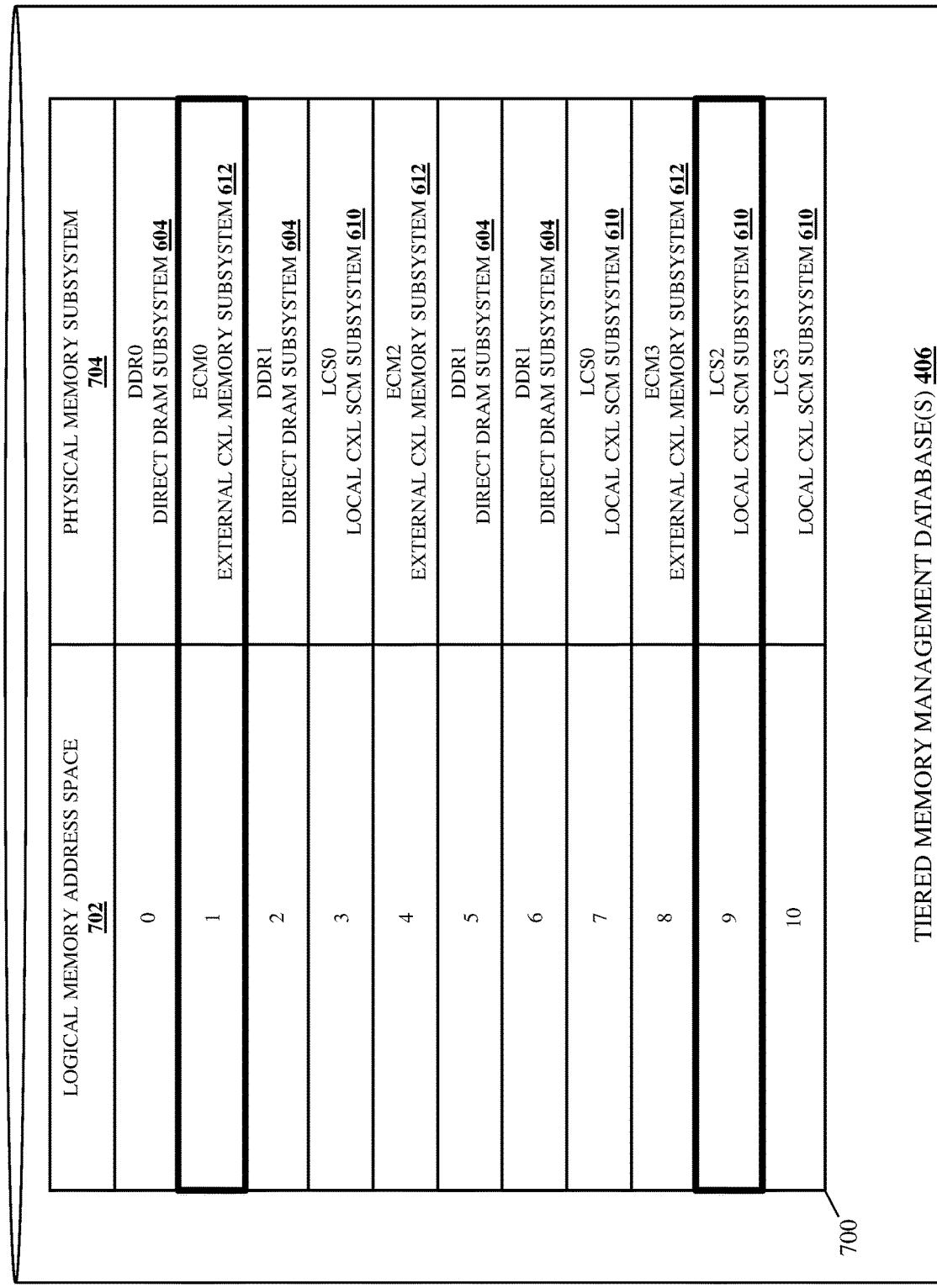
FIG. 9C is a schematic view illustrating an embodiment of the identification of data movement between memory subsystems in the tiered memory system of FIG. 7A during the method of FIG. 5.

With reference to FIGS. 9A, 9B, and 9C, another embodiment of decision blocks 506, 508, and 510 is illustrated and described in which a memory subsystem in a memory subsystem tier has experienced a health issue that includes that memory subsystem being written to a threshold amount more than the other memory subsystems in the same memory subsystem tier and, in response, the number of logical memory address spaces associated with that memory subsystem is reduced to reduce the write frequency to that memory subsystem relative to the other memory subsystems in its memory subsystem tier. With reference to FIG. 9A, in this example of decision block 506, the tiered memory management engine 404 may identify a health issue in the LCS2 memory subsystem (e.g., as indicated by the bolded box in FIG. 9A) based on the LCS2 memory subsystem reaching a relative memory subsystem write threshold in response to a number of writes performed in the LCS2 memory subsystem that is included in the fifth memory subsystem tier 604 exceeding a number of writes performed in the LCS0, LCS1, and/or LCS2 memory subsystems in the fifth memory subsystem tier 610 by some threshold amount.

With reference to FIG. 9B, the tiered memory management engine 404 in the tiered memory management system 312/400 may use the logical memory address space/memory subsystem association table 700 to determine that the LCS2 memory subsystem in the fifth memory subsystem tier 610 that was determined to have reached the relative memory subsystem write threshold at decision block 506 (e.g., as indicated by the bolded boxes in FIG. 9B) is associated with the logical memory address spaces 1 and 9. In an embodiment, at block 508 and in response to determining that the LCS2 memory subsystem has reached the relative memory subsystem write threshold, the tiered memory management engine 404 may mark the data stored in the logical memory address space 1 associated with the LCS2 memory subsystem in the fifth memory subsystem tier 610 for memory subsystem tier movement. Furthermore, in response to the data stored in the logical memory address space 1 associated with the LCS2 memory subsystem being marked for memory subsystem tier movement, the data mover device(s) 408 may move that data to the ECM0 memory subsystem in the sixth memory subsystem tier 612, as illustrated in FIG. 9C.

In different embodiments, the movement of the data stored in the logical memory address space 1 associated with the LCS2 memory subsystem to the ECM0 memory subsystem in response to being marked for memory subsystem tier movement may be performed using a variety of tiered memory system data movement techniques that would be apparent to one of skill in the art in possession of the present disclosure. For example, one of skill in the art in possession of the present disclosure will appreciate how the marking of the data logical memory address space 1 associated with the LCS2 memory subsystem for memory subsystem tier movement may include "demoting" the logical memory address space 1 associated with the LCS2 memory subsystem that has reached the relative memory subsystem write threshold to a lower memory subsystem tier, and thus may result in the movement of the data stored in the logical memory address space 1 to memory subsystem(s) in lower memory subsystem tiers like the ECM0 memory subsystem in the sixth memory subsystem tier 612 in the illustrated examples. However, one of skill in the art in possession of the present disclosure will recognize how tiered memory system data movement techniques may be utilized to move the data stored in the logical memory address space 1 from the LCS2 memory subsystem in the fifth memory subsystem tier 610 to memory subsystem(s) in lower memory subsystem tiers, the same memory subsystem tier, and/or higher memory subsystem tiers (e.g., when such memory subsystems have available space) while remaining within the scope of the present disclosure as well.

As such, with reference to FIG. 9C, in an embodiment of block 508 and in response to the marking of the data stored in the logical memory address space 1 associated with the LCS2 memory subsystem that has reached the relative memory subsystem write threshold, the data mover device(s) 408 may move that data from the LCS2 memory subsystem to the ECM0 memory subsystems. Thus, the marking of the data by the tiered memory management engine 404 may result in the disassociation of the logical memory address space 1 from the LCS2 memory subsystem in the fifth memory subsystem tier 610 and the association of that logical memory address space 1 with the ECM0 memory subsystem in the sixth memory subsystem tier 612. The method 500 then proceeds to block 510 where the tiered memory management system causes the computing subsystem that was storing data in the first memory subsystem to store data in the second memory subsystem similarly as described above. Following block 510, the computing subsystem(s) assigned the logical memory address space 1 may store and utilize data in the ECM0 memory subsystem.

As will be appreciated by one of skill in the art in possession of the present disclosure, following the movement of the data to the ECM0 memory subsystem, the LCS2 memory subsystem should experience fewer writes (e.g., due the data associated with logical memory address space 1 now being located to the ECM0 memory subsystem), but at the cost of reducing the amount of memory subsystem space in the fifth memory subsystem tier 610. However, the data moved to the ECM0 memory subsystem may be later moved to another memory subsystem tier as per conventional tiered memory system operations. For example, in the event the access frequency of that data reaches or exceeds a threshold, that data may be moved from the ECM0 memory subsystem in the sixth memory subsystem tier 612 to at least one memory subsystem in a higher memory subsystem tier in the tiered memory system 600, and one of skill in the art in possession of the present disclosure will appreciate how that data may be moved to at least one memory subsystem in a lower memory subsystem tier in a similar manner. In a specific example, following block 510 the disparity in writes between the LCS2 memory subsystem and the other memory subsystems in the fifth memory subsystem tier 610 (e.g., the LCS0, LCS1, and LCS3 memory subsystems) may reduce below the relative memory system write threshold, and the logical memory address space 1 may again be associated with the LCS2 memory subsystem.

Thus, systems and methods have been described that provide for the management of memory subsystems in a tiered memory system in a manner that allows the preemptive removal of failing memory subsystems without interruption of the computing subsystems (e.g., the operating system and/or applications) using them, as well as the alleviation of uneven wear patterns in memory subsystems tiers by adjusting the rate of writes to memory subsystem that are reaching their write endurance limits faster than other memory subsystems in a memory subsystem tier. For example, the tiered memory management system of the present disclosure may be coupled to a first memory subsystem associated with a first memory subsystem tier, and a second memory subsystem associated with a second memory subsystem tier that is different than the first memory subsystem tier. The tiered memory management system monitors a health of the first memory subsystem associated with the first memory subsystem tier and the second memory subsystem associated with the second memory subsystem tier. When the tiered memory management system identifies a health issue with the first memory subsystem associated with the first memory subsystem tier, it moves data stored in the first memory subsystem associated with the first memory subsystem tier to the second memory subsystem associated with the second memory subsystem tier. As such, failure issues present in conventional tiered memory systems are eliminated.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A tiered memory system that is configured to store data for a computing device and that includes:
   a first memory subsystem having first physical memory that is included in a first memory subsystem tier that is provided a first ranking in the tiered memory system that is based on the first memory subsystem tier including physical memory having first memory performance characteristics; and
   a second memory subsystem having second physical memory that is included in a second memory subsystem tier that is provided a second ranking in the tiered memory system that is different than the first ranking and that is based on the second memory subsystem tier including physical memory having second memory performance characteristics that are different than the first memory performance characteristics; and
   a tiered memory management system that is coupled to the first memory subsystem and the second memory subsystem, wherein the tiered memory management system includes at least one physical processor that is configured to:
      monitor a health of the first memory subsystem and the second memory subsystem;
      determine, while first data is stored in the first memory subsystem and utilized by the computing device, that the health of the first memory subsystem has reached at least one unavailability threshold; and
      move, in response to identifying that the health of the first memory subsystem has reached the at least one unavailability threshold, the first data stored in the first memory subsystem to the second memory subsystem such that the computing device utilizes the first data stored in the second memory subsystem, and second data is stored in the second memory subsystem and utilized by the computing device.

2. The tiered memory system of claim 1, wherein the moving the first data stored in the first memory subsystem to the second memory subsystem includes:
   marking the first data stored in the first memory subsystem for memory subsystem tier movement, wherein the marking of the first data stored in the first memory subsystem for memory subsystem tier movement is configured to cause a data mover device to move the first data stored in the first memory subsystem to the second memory subsystem.

3. The tiered memory system of claim 1, wherein the second ranking of the second memory subsystem tier in the tiered memory system is lower than the first ranking of the first memory subsystem tier in the tiered memory system based on the second memory subsystem tier including physical memory having the second memory performance characteristics that are lower than the first memory performance characteristics of physical memory included in the first memory subsystem tier.

4. The tiered memory system of claim 1, wherein the first ranking of the first memory subsystem tier in the tiered memory system is based on the first memory subsystem tier including physical memory having the first memory performance characteristics that include a first latency, and the second ranking of the second memory subsystem tier in the tiered memory system is based on the second memory subsystem tier including physical memory having second memory performance characteristics that include a second latency that is different than the first latency.

5. The tiered memory system of claim 1, wherein the tiered memory management system is configured to:
   associate, prior to identifying that the health of the first memory subsystem has reached the at least one unavailability threshold, a logical memory address space with the first memory subsystem to cause a computing subsystem to store the first data in the first memory subsystem associated with the first memory subsystem tier; and
   in response to identifying that the health of the first memory subsystem has reached the at least one unavailability threshold:
      disassociate the logical memory address space from the first memory subsystem; and
      associate the logical memory address space with the second memory subsystem to cause the computing subsystem to store the second data in the second memory subsystem.

6. The tiered memory system of claim 1, wherein the at least one unavailability threshold includes:
   a relative memory subsystem write threshold for the first memory subsystem.

7. An Information Handling System (IHS), comprising:
   a hardware processing system; and
   a hardware memory system that is coupled to the hardware processing system and that includes instructions that, when executed by the hardware processing system, cause the hardware processing system to provide a tiered memory management engine that is configured to:
      monitor a health of a first memory subsystem having at least one first physical memory device that is included in a first memory subsystem tier that is provided a first ranking in a tiered memory system that is based on the first memory subsystem tier including memory devices having first memory device performance characteristics, and a second memory subsystem having at least one second physical memory device that is included in a second memory subsystem tier that is provided a second ranking in the tiered memory system that is different than the first ranking and that is based on the second memory subsystem tier including memory devices having second memory device performance characteristics that are different than the first memory device performance characteristics;

determine, while first data is stored in the first memory subsystem and utilized by a computing device, that the health of the first memory subsystem has reached at least one unavailability threshold; and move, in response to identifying that the health of the first memory subsystem has reached the at least one unavailability threshold, the first data stored in the first memory subsystem to the second memory subsystem such that the computing device utilizes the first data stored in the second memory subsystem, and second data is stored in the second memory subsystem and utilized by the computing device.

8. The IHS of claim 7, wherein the moving the first data stored in the first memory subsystem to the second memory subsystem includes:

marking the first data stored in the first memory subsystem for memory subsystem tier movement, wherein the marking of the first data stored in the first memory subsystem for memory subsystem tier movement is configured to cause a data mover device to move the first data stored in the first memory subsystem to the second memory subsystem.

9. The IHS of claim 7, wherein the second ranking of the second memory subsystem tier in the tiered memory system is lower than the first ranking of the first memory subsystem tier in the tiered memory system based on the second memory subsystem tier including memory devices having the second memory device performance characteristics that are lower than the first memory device performance characteristics of memory devices included in the first memory subsystem tier.

10. The IHS of claim 7, wherein the first ranking of the first memory subsystem tier in the tiered memory system is based on the first memory subsystem tier including memory devices having the first memory device performance characteristics that include a first latency, and the second ranking of the second memory subsystem tier in the tiered memory system is based on the second memory subsystem tier including memory devices having second memory device performance characteristics that include a second latency that is different than the first latency.

11. The IHS of claim 7, wherein the tiered memory management engine is configured to:

associate, prior to identifying that the health of the first memory subsystem has reached the at least one unavailability threshold, a logical memory address space with the first memory subsystem to cause a computing subsystem to store the first data in the first memory subsystem associated with the first memory subsystem tier; and in response to identifying that the health of the first memory subsystem has reached the at least one unavailability threshold:

disassociate the logical memory address space from the first memory subsystem; and associate the logical memory address space with the second memory subsystem to cause the computing subsystem to store the second data in the second memory subsystem.

12. The IHS of claim 7, wherein the at least one unavailability threshold includes:

a relative memory subsystem write threshold for the first memory subsystem.

13. The IHS of claim 12, wherein the tiered memory management engine is configured to:

determine that the first memory subsystem is below the relative memory subsystem write threshold and, in response, move the first data and the second data stored in the second memory subsystem to the first memory subsystem.

14. A method for managing tiered memory, comprising:

monitoring, by a tiered memory management system, a health of a first memory subsystem having at least one first physical memory device that is included in a first memory subsystem tier that is provided a first ranking in a tiered memory system that is based on the first memory subsystem tier including memory devices having first memory device performance characteristics, and a second memory subsystem having at least one second physical memory device that is included in a second memory subsystem tier that is provided a second ranking in the tiered memory system that is different than the first ranking and that is based on the second memory subsystem tier including memory devices having second memory device performance characteristics that are different than the first memory device performance characteristics tier;

determining, by the tiered memory management system while first data is stored in the first memory subsystem and utilized by a computing device, that the health of the first memory subsystem has reached at least one unavailability threshold; and moving, by the tiered memory management system in response to identifying that the health of the first memory subsystem has reached the at least one unavailability threshold, the first data stored in the first memory subsystem to the second memory subsystem such that the computing device utilizes the first data stored in the second memory subsystem, and second data is stored in the second memory subsystem and utilized by the computing device.

15. The method of claim 14, wherein the moving the first data stored in the first memory subsystem to the second memory subsystem includes: marking the first data stored in the first memory subsystem for memory subsystem tier movement, wherein the marking of the first data stored in the first memory subsystem for memory subsystem tier movement is configured to cause a data mover device to move the first data stored in the first memory subsystem to the second memory subsystem.

16. The method of claim 14, wherein the second ranking of the second memory subsystem tier in the tiered memory system is lower than the first ranking of the first memory subsystem tier in the tiered memory system based on the second memory subsystem tier including memory devices having the second memory device performance characteristics that are lower than the first memory device performance characteristics of memory devices included in the first memory subsystem tier.

17. The method of claim 14, wherein the first ranking of the first memory subsystem tier in the tiered memory system is based on the first memory subsystem tier including memory devices having the first memory device performance characteristics that include a first latency, and the second ranking of the second memory subsystem tier in the tiered memory system is based on the second memory subsystem tier including memory devices having second memory device performance characteristics that include a second latency that is different than the first latency.

18. The method of claim 14, further comprising:

associating, by the tiered memory management system prior to identifying that the health of the first memory subsystem has reached the at least one unavailability threshold, a logical memory address space with the first memory subsystem to cause a computing subsystem to store the first data in the first memory subsystem associated with the first memory subsystem tier; and in response to identifying that the health of the first memory subsystem has reached the at least one unavailability threshold:
- disassociating, by the tiered memory management system, the logical memory address space from the first memory subsystem; and
- associating, by the tiered memory management system, the logical memory address space with the second memory subsystem to cause the computing subsystem to store the second data in the second memory subsystem.

19. The method of claim 14, wherein the at least one unavailability threshold includes:
a relative memory subsystem write threshold for the first memory subsystem.

20. The method of claim 19, further comprising: determining, by the tiered memory management system, that the first memory subsystem is below the relative memory subsystem write threshold and, in response, moving the first data and the second data stored in the second memory subsystem to the first memory subsystem.

* * * * *

UNITED STATES PATENT AND TRADEMARK OFFICE
CERTIFICATE OF CORRECTION

| | |
|---|---|
| PATENT NO. | : 12,210,414 B2 |
| APPLICATION NO. | : 18/073915 |
| DATED | : January 28, 2025 |
| INVENTOR(S) | : William Price Dawkins et al. |

It is certified that error appears in the above-identified patent and that said Letters Patent is hereby corrected as shown below:

In the Claims

Claim 14, Column 20, Line 22, should read as follows:
-- device performance characteristics; --

Signed and Sealed this
Eighth Day of April, 2025

Coke Morgan Stewart
*Acting Director of the United States Patent and Trademark Office*